March 6, 1945.  P. A. DEARDORFF ET AL  2,370,640

HYDRAULIC TRANSMISSION

Filed April 25, 1942  4 Sheets-Sheet 1

INVENTORS
Paul A. Deardorff and
BY Charles A. Balton
Popp and Popp
ATTORNEYS

March 6, 1945. P. A. DEARDORFF ET AL 2,370,640
HYDRAULIC TRANSMISSION
Filed April 25, 1942 4 Sheets-Sheet 2

INVENTORS
Paul A. Deardorff and
BY Charles A. Balton
Popp and Popp
ATTORNEYS

Fig. 6.

Patented Mar. 6, 1945

2,370,640

UNITED STATES PATENT OFFICE 2,370,640

HYDRAULIC TRANSMISSION

Paul A. Deardorff, Detroit, Mich., and Charles A. Balton, Buffalo, N. Y.

Application April 25, 1942, Serial No. 440,464

14 Claims. (Cl. 192—59)

This invention relates to a hydraulic transmission whereby varying rates of speed can be obtained between the driving and driven shafts of any mechanism, the transmission being capable of use for example, in place of the usual gear shift transmission mechanism of automobiles. The transmission forming the subject of the invention can also be used as a torque absorber in marine use, for example, in absorbing excessive torque upon the propeller shaft as the propeller leaves the water, races and is suddenly slowed down upon reentering the water.

More particularly the invention relates to the type of gearless and clutchless transmission having a nutating disk or plate rotating with one of the shafts of the transmission and connected by a series of pistons with cylinders fast to the other shaft of the mechanism, the control of the relative rotation of the nutating driving disk or plate and the driven shaft of the transmission being effected by controlling the restriction to the flow of fluid pumped into and out of the cylinders by the pistons.

One of the principal objects of the invention is to provide a transmission of the above type which is adapted to heavy loads and which is of simple construction and which will stand up under conditions of severe and constant use without getting out of order or requiring repairs.

Another object of the invention is to provide such a transmission which can be controlled either by centrifugal means associated with the driving shaft to control the degree of slippage between the driving shaft and the driven shaft or by a manual means.

Another object of the invention is to provide such a control which is simple and positive in its action.

Another object is to provide such a transmission which can be readily assembled and disassembled and which requires a minimum amount of machining to produce the various parts of the transmission.

Another object is to provide such a hydraulic transmission which is compact in construction and in which there is little likelihood of leakage of the liquid through which the operation of the transmission is controlled.

In Figs. 1–5 is shown a transmission which is automatic in its operation, the relative rotation of the driving and driven parts of the transmission being controlled by the speed of the driving part and a positive brake being applied to the driven part when the transmission is brought to a neutral condition. Thus, with the transmission shown in Figs. 1–5, when the driving shaft increases from an idling speed, it first releases the brake for the driven shaft and thereafter, through a series of centrifugally moved weights, increases the restriction to the flow of fluid to and from the controlling cylinders, as hereinafter described, so as to progressively bring the driving and driven parts into a direct drive.

In the form of the invention shown in Figs. 1–5, the driving part or shaft of the transmission is indicated at 10 and the driven part or shaft of the transmission is indicated at 11, the driven part or shaft 11 being provided with a central bore 12 and being shown as connecting with the usual reversing gearing contained within a reversing gear case 13. The reversing gearing forms no part of the present invention and hence is not shown in detail.

Figure 1:
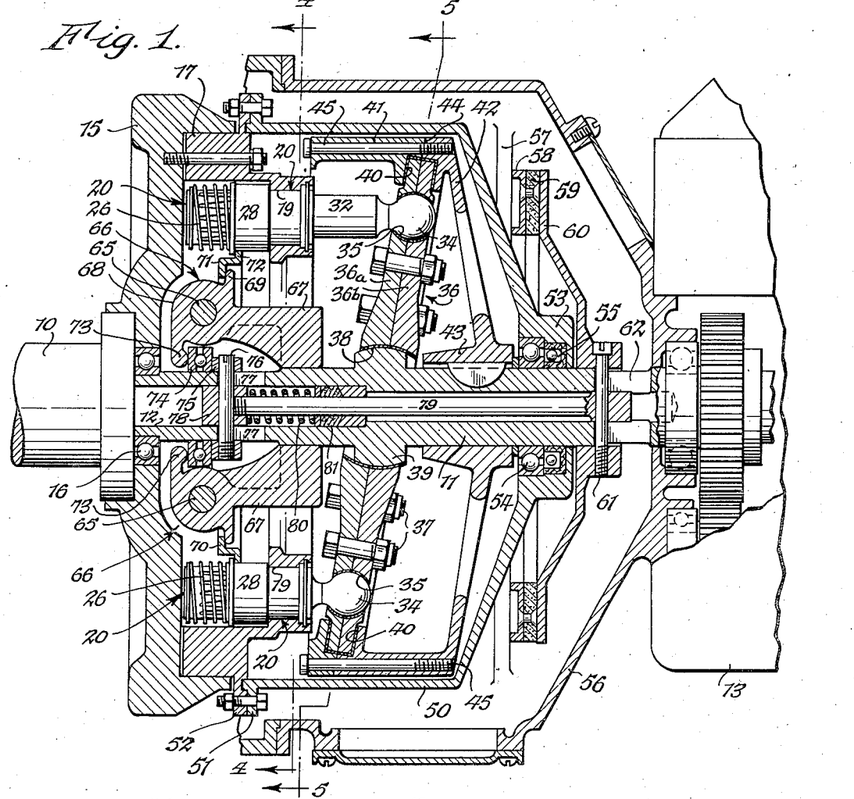
Fig. 1 is a vertical longitudinal section, through one form of a hydraulic transmission embodying our invention.
Figures 2, 3:
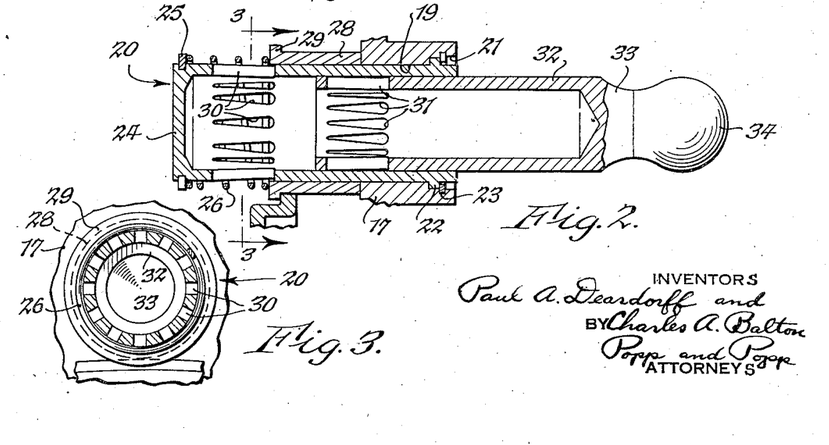
Fig. 2 is an enlarged fragmentary section similar to Fig. 1 and showing in particular the construction of one of the pistons and cylinders which form a part of the transmission.
Fig. 3 is a vertical section, taken on line 3—3, Fig. 2.
Figure 4:
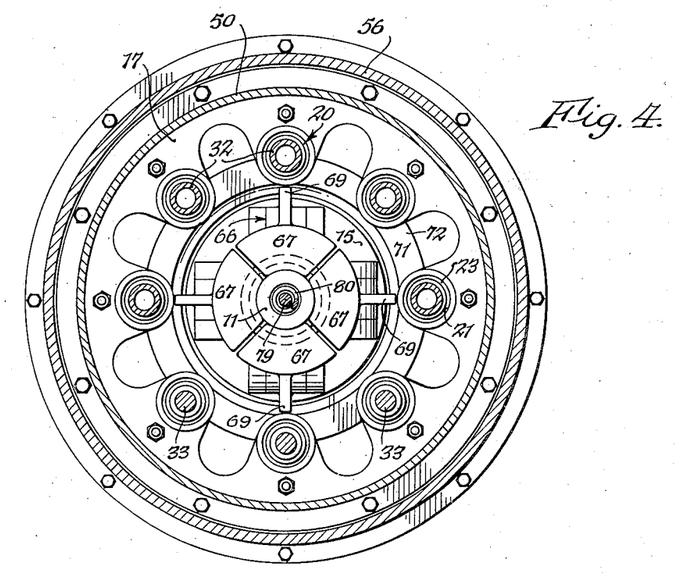
Figs. 4 and 5 are diminutive vertical cross sections, through the transmission, taken on the correspondingly numbered lines of Fig. 1.
Figure 5:
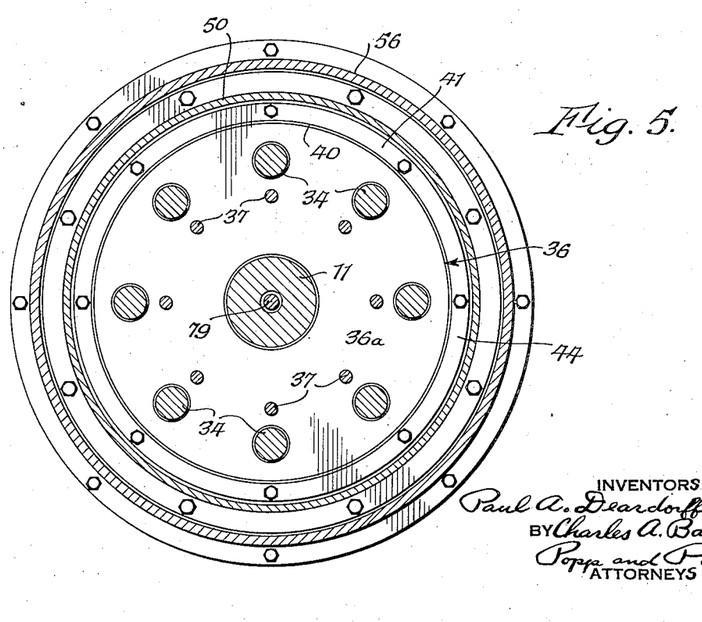

An imperforate wheel or flywheel 15 is fast to the end of the drive shaft 10, the hub of this flywheel being shown as carrying a roller bearing 16 in which the end of the driven shaft 11 is journaled. An annular casting 17 is shown as suitably secured to that face of the flywheel 15 opposing the reversing gear case 13, and this annular casting is formed to provide a series of uniformly spaced bores 19 which are arranged concentric and parallel with the axis of the drive and driven shafts 10 and 11, the annular casting 17 being shown as provided with eight of such bores although any suitable number can be employed. In each of these bores is fitted a cylinder indicated generally at 20 and for this purpose, as best shown in Fig. 2, each bore 19 is enlarged at the end opposing the reversing gear case 13, as indicated at 21, to receive an annular bead 22 on the corresponding cylinder 20 and is provided with an annular groove receiving a split retaining ring 23 which holds the bead and the cylinder 20 in position in the bore 19.

Each of the cylinders 20 is of cup shaped form and its closed end 24 projects from the opposite end of its bore 19 and is provided with an external annular groove receiving a split retaining ring 25. This split retaining ring 25 forms the end abutment of a helical compression spring 26, the other end of which bears against the end of a control sleeve 28 which is slidingly mounted on the cylinder 20 and is yieldingly held against the annular casting 17 by the helical compression spring 26. Each of these control sleeves 28 is provided at its outer end with an enlarged bead 29 forming a shoulder for actuating the sleeve and is slidable against the resistance of its compression spring 26 to cover, in a varying degree, an annular series of teardrop shaped ports 30 provided in parallel arrangement around the exposed end of the cylinder. Each of these teardrop shaped ports 30 has its enlarged end projecting toward the reversing gear case 13 and is adapted to register with similarly shaped and arranged ports 31 in a plunger or piston 32 working in the cylinder.

Each of the pistons or plungers 32 projects outwardly from the open end of the corresponding cylinder 20 and is of cup shaped form having a closed outer extremity 33. To this extremity is secured a ball shaped head 34 which fits in a socket 35 provided in a nutating disk or plate indicated generally at 36. This nutating disk or plate 36 is made in two halves 36a and 36b, the two disk shaped halves being held together by an annular series of bolts 37 to securely hold the ball shaped ends 34 of the plungers in their sockets 35. The central parts of the two halves of the nutating disk or plate 36 are enlarged and jointly provide a central spherical shaped socket 38 which fits around the spherical periphery of an enlargement 39 provided on the driven shaft 11.

The periphery of the nutating disk or plate 36 rides in an internal bearing groove 40 provided in the rim 41 of a cage 42, this cage having a hub 43 keyed to the driven shaft 11. To permit of fitting the periphery of the nutating disk or plate 36 in the bearing groove 40, the rim 41 is split along a line 44 arranged centrally of the groove 40 and the two parts of the rim 41 are secured together by screws 45 or in any other suitable manner. The groove 40 is arranged at an angle to the perpendicular of the axis of the driving and driven shafts 10 and 11 and it will therefore be seen that as the parts rotate, the disk or plate 36 nutates thereby to work the pistons 32 into and out of the cylinders 20 as long as they are free to do so. The periphery of the nutating disk 36 is free to rotate in the internal groove 40 of the cage 42.

The parts rotate in a body of liquid contained within a drum 50 having a rim 51 suitably bolted to an outwardly extending annular flange 52 provided on the annular casting 17 which carries the cylinders 20. The hub 53 at the opposite end of the drum 50 houses a roller bearing 54 and oil seal 55 which embrace the driven shaft 11 so as to retain the body of liquid in the drum 50 and in operative relation to the ports 30 of the cylinders 20 as hereinafter described.

The entire transmission as above described is housed within a stationary transmission casing 56 which can be of any suitable form and can be secured to the reversing gear case 13 in any suitable manner. This stationary transmission gear casing 56 is shown as provided with internal lugs 57 which carry a ring 58 which is arranged concentric with the axis of the driven shaft 11. A friction brake facing 59 is secured to the face of the stationary ring 58 opposing the reversing gear case 13 and this friction brake face is engaged by the rim of a brake disk 60 which is slidingly mounted on and rotates with the driven shaft 11. For this purpose, the hub of the brake disk 60 fits the driven shaft and is provided with a cross pin 61 which extends through a pair of opposite longitudinal slots 62 provided in the walls of the bored driven shaft 11.

Means are provided for automatically actuating the control sleeves 28 surrounding the cylinders 20 and the brake disk 60 in response to the speed of the driving shaft 10, these means being preferably constructed as follows:

The flywheel 15 carries a series of pins 65, four being shown, and each being shown as arranged at right angles to each other and at right angles to the axis of the flywheel 15. Each of these pins 65 pivotally supports a centrifugal weight 66 the weighted end 67 of which projects toward the reversing gear case 13 and normally rests against the adjacent part of the driven shaft 11. The hub 68 of each of these weights is formed to provide a finger 69 which engages that face of an inwardly projecting flange 70 of a shifting ring 71 which opposes the reversing gear case 13. The shifting ring 71 is provided with an outwardly projecting flange 72 which engages the several shoulders provided on the control sleeves 28 provided by the bead 29 on each of these sleeves.

To control the brake disk 60, the hub 68 of each of the centrifugal weights 66 is provided with an inwardly projecting finger 73 which engages one race of a roller thrust bearing 74 slidingly mounted on the driven shaft 11. The other race of this roller thrust bearing 74 engages a ring 75 also slidingly mounted on the driven shaft 11. This sliding ring 75 carries a cross pin 76 which moves through a pair of longitudinal slots 77 provided in the opposite walls of the driven shaft 11, this cross pin 76 carrying a cylindrical head 78 working in the bore 12 of the driven shaft 11. This head is connected by a rod 79 with the cross pin 61 of the brake disk 60 and a helical compression spring 80 is interposed between this head 78 and a stuffing box 81 in the bore 12 surrounding the rod 79.

In operation, when the driving shaft 10 is idling, the helical compression spring 80 urges the rod 79 to the left, as viewed in Fig. 1, thereby, through the cross pin 61, to urge the brake disk 60 into braking engagement with the friction facing 59 of the stationary brake ring 58. Since the pin 61 compels the driven shaft 11 and the brake disk 60 to rotate together, it will be seen that this action of the helical compression spring 89 serves to hold the driven shaft 11 stationary.

When the driving shaft 10 is idling, this helical compression spring 80, through the cylindrical head 78, cross pin 76, sliding ring 75 and thrust bearing 74 urges the fingers 73 of the centrifugal weights 66 to the left, as viewed in Fig. 1.

This holds the weighted ends 67 of these weights against the driven shaft 11 and holds the other fingers 69 of these weights in a position in which the shifting ring 71 is free to assume its extreme right hand position as viewed in Fig. 1. In this position of the shifting ring 71, the helical compression spring 26 on each of the cylinders 20 holds the corresponding control sleeve valve 28 in its extreme right hand position as viewed in Figs. 1 and 2 thereby to leave the teardrop shaped ports 30 in each cylinder 20 open for the free ingress and egress of the body of liquid contained in the drum 50 into and out of each cylinder 20.

Since these cylinders 20 are fast to the annular casting 17 which is in turn secured to the flywheel 15 of the drive shaft 10, these cylinders rotate with the drive shaft 10 and carry with them the pistons 32. These pistons have their ball ends 34 secured in sockets 35 in the nutating disk or plate 36 and hence the rotation of the pistons 32 with the drive shaft effects a similar rotation of the nutating disk or plate 36. As the pistons are free to slide in the cylinders 20, however, this rotation of the nutating disk 36 merely serves to work the plungers or pistons 32 back and forth in the cylinders 20, pumping liquid into and out of these cylinders through the teardrop ports 30, no motion being transmitted to the cage 42, the periphery of the nutating disk or plate 36 merely riding idly around in the groove 40 in the rim of this cage. Hence, when the drive shaft 10 is idling, no motion is transmitted to the driven shaft 11.

When the speed of the drive shaft 10 rises above idling speeds, the ends 67 of the weights 66 carried by the flywheel 15 swing outwardly under centrifugal force.

This causes the finger 73 of each of these weights to move to the right, as viewed in Fig. 1, and hence similarly shifts to the right, against the resistance of the helical compression spring 80, the thrust bearing 74, sliding ring 75, cross pin 76, head 78 in the bore 12 of the drive shaft, rod 79, cross pin 61 and brake disk 60. This frees the rim of the brake disk from the friction facing 59 of the stationary brake ring 58 and hence leaves the driven shaft 11 of the transmission free to rotate.

This outward movement of the weighted ends 67 of the weights 66 also moves the fingers 69 on the hubs of these weights 66 to the left, as viewed in Fig. 1. This forces the shifting ring 71 to the left and since the outwardly projecting flange 72 of this ring engages the shoulders provided by the beads 27 at the outer extremities of the control valve sleeves 28, each of these control sleeves 28 is also shifted to the left to cover the ports 30 to a greater degree. This restricts the flow of fluid from the body contained within the drum 50 into and out of each cylinder 20 and hence places a resistance upon the free movement of the plungers 32 into and out of these cylinders. Accordingly, the free nutation of the nutating disk or plate 36 is restricted and its free rotation in the angular groove 40 is likewise impeded so that power is transmitted through this nutating disk or plate 36 to the cage 42. Since this cage 42 is fast to the driven shaft 11, this motion is transmitted to the driven shaft 11 and hence a drive is established between the driving and driven shafts 10 and 11.

As the speed of the driving shaft 10 increases the weighted ends 67 of the centrifugal weights 66 are thrown further outward, thereby to move the control valve sleeves 28 to cover still more of the ports 30 of each cylinder 20. This imposes a still greater restriction to the free movement of the pistons 32 back and forth in the cylinders 20 and hence further restricts the free rotation of the nutating plate or disk 36 in the groove 40, thereby to drive the cage 42 and driven shaft 11 at a still higher speed. When the speed of the drive shaft 10 is high enough to throw the weighted ends of the centrifugal weights 66 outwardly sufficiently far to cause the control valve sleeves 28 to completely cover the ports 30, no fluid can be pumped into and out of the cylinders 20 and hence the plungers 32 are held against all movement. When this occurs the rotation of the nutating disk or plate 36 is stopped and a direct drive is established through the cage 42 to the driven shaft 11.

It will therefore be seen that the adjustment of the relative rotation of the drive shaft 10 and driven shaft 11 can be readily controlled by adjusting the control valve sleeves 28 to cover the ports 30 to a greater or less degree and hence that the present transmission provides a transmission in which the driven shaft is gradually brought up to the speed of the driving shaft. This is shown in Figs. 1–5 as accomplished in response to the speed of the driving shaft through the centrifugal weights 66, but it is apparent that the control can be accomplished manually. This modification of the invention is illustrated in Figs. 6–10.

In this form of the invention illustrated in Figs. 6–10, the driving part or shaft of the transmission is indicated at 90 and the driven part or shaft 91 is provided with a central bore 92 and is shown as connecting with the usual reversing gearing contained within a reversing gear case 93. As with the form of the invention shown in Figs. 1–5, this reversing gearing forms no part of the present invention and hence is not shown in detail.

Figure 6:
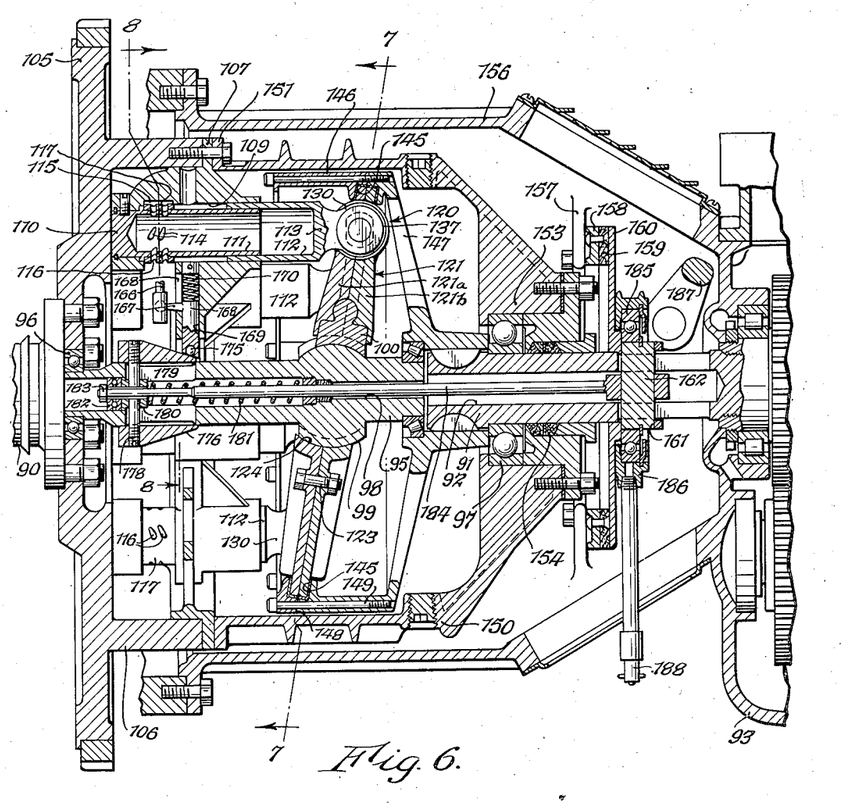
Fig. 6 is a view similar to Fig. 1 showing a modified form of transmission embodying our invention.

A short intermediate shaft 95 is interposed between the ends of the driving shaft 90 and the driven shaft 91, this shaft 95 being journaled at one end in a bearing 96 carried by the driving shaft and at its opposite end in a bearing 97 carried by the driven shaft 91. This intermediate shaft 95 is provided with an axial bore 98 and is externally formed to provide a ball shaped enlargement 99, the spherical surface of this ball shaped enlargement being cut to provide a series of longitudinal curved keyways carrying keys 100 for a purpose hereinafter described.

An imperforate wheel or flywheel 105 is fast to the end of the drive shaft 90, the hub of this flywheel carrying the bearing 96 in which the end of the intermediate shaft 95 is journaled. The flywheel is shown as having an annular face flange 106 which projects toward the reversing gear case 93 and to the end of this flange is bolted an annular casting 107. This annular casting is formed to provide a series of uniformly spaced bores 109 which are arranged concentric and parallel with the axis of the drive and driven shafts 90 and 91, the annular casting 107 being shown as provided with five of such bores although any suitable number can be employed.

That end of each bore 109 which is adjacent the flywheel 105 is of reduced size and in this reduced part of each bore is secured the closed end 110 of a tubular cylinder 111, the opposite open end of which faces the reversing gear case 93. The exterior of each cylinder is spaced from the enlarged part of each bore 109 and in this space is fitted the open end of a cylindrical piston or plunger 112, each piston or plunger 112 having a closed end 113, so that as the plunger or piston is reciprocated, liquid is pumped into and out of the cylinder 111. This liquid flows through an annular series of ports 114 in the wall of each cylinder 111 near its closed end 110, these ports communicating with an open valve chamber 115 through the ports 116 of a rotatable valve sleeve 117 arranged within the open valve chamber 115 and fitting around the ported end of the cylinder 111. The ports 114 and 116 of the cylinder and valve sleeve, respectively, are of teardrop form and disposed at an angle so that as the valve sleeve 117 is rotated, the effective area of the ports is gradually reduced or increased, thereby to provide any desired restriction to the flow of liquid into and out of the cylinder.

The outer end of each piston or plunger 112 is secured by a ball joint indicated generally at 120 to a nutating disk or plate 121. This nutating disk or plate 121 is made in two halves 121a and 121b, the two disk shaped halves being held together by an annular series of bolts 123. The central parts of the two halves of the nutating disk or plate 121 jointly provide a spherical socket 124 which fits around the spherical periphery of the enlargement 99 on the intermediate shaft 95 and the two halves of the nutating disk or plate are also formed to receive and hold the keys 100 which ride in the curved keyways provided in the ball shaped enlargement 99.

Figure 7:
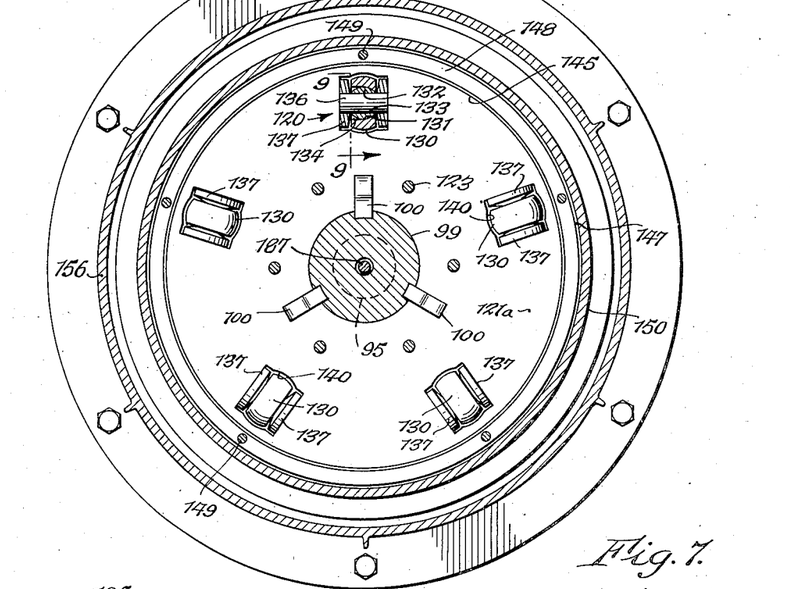
Fig. 7 is a vertical transverse section, taken on line 7—7, Fig. 6.
Figure 9:
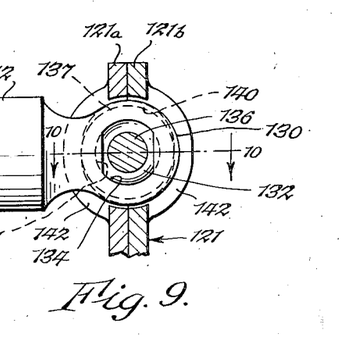
Fig. 9 is an enlarged fragmentary vertical section, taken on line 9—9, Fig. 7.
Figure 10:
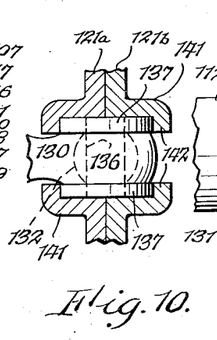
Fig. 10 is a fragmentary vertical section, taken on line 10—10, Fig. 9.

The ball joint 120 connecting each piston or plunger 112 with the nutating disk or plate 121 is shown as constructed as follows:

As best shown in Figs. 7, 9 and 10, each of the pistons or plungers 112 is formed at its closed end 113 to provide a rounding flat sided extension or ear 130 having a spherical bore 131 which opens on the opposite flat sides of the ear or extension. This bore 131 receives a ball 132 which is provided with a through bore 133. In providing the through bore 133 the ball 132 is, in effect, rendered flat sided, the opposite edges of the bore 133 being in parallel planes which are spaced closer than the diameter of the ball. Advantage is taken of this to permit inserting the ball 132 in the spherical bore 131, the ear 130 being provided at one side with a pair of straight grooves 134 at opposite sides of the spherical bore 133, so that the ball can be slipped endwise through the grooves 134 into the spherical bore 131, following which the ball 132 can be turned so as to bring its spherical faces into full bearing engagement with the spherical bore 131 and so as to be confined therein. In this turned position of the ball 132, its through bore 133 is in coaxial relation to the through axis of the spherical bore 131 and a pin 136 is fitted into the bore 133 with its opposite ends projecting outwardly therefrom. In these projecting ends of each of these pins 136 are fitted small disks or wheels 137.

Each of the ball and socket structures as above described is held within an aperture 140 jointly provided by the two halves of the nutating disk or plate 121. For this purpose each half 121a and 121b of this nutating disk or plate 121 is provided on opposite sides of each of its apertures 140 with a pair of outwardly projecting rounded ears 141 each of which is provided with a rim 142 embracing and holding the rim of the corresponding disk or wheel 137. It will be seen that the ball 132 and the cylindrical bore 131 provide a ball and socket joint between each piston or plunger 112 and the nutating disk or plate 121. The disks or wheels 137 are preferably afforded a limited movement radially of the nutating disk or plate 121 to prevent cocking of the pistons 112 on their cylinders 111.

As with the form of the invention shown in Figs. 1–5, the periphery of the nutating disk or plate 121 rides in an internal bearing groove 145 provided in the rim 146 of a cage 147, this cage being keyed to the driven shaft 91. To permit of fitting the periphery of the nutating disk or plate 121 in the bearing groove 145, the rim 146 is split along a line 148 arranged medially of the groove 145 and the two parts of the rim 146 are secured together by screws 149 or in any other suitable manner. The groove 145 is arranged at an angle to the perpendicular of the axis of the driving and driven shafts 90 and 91 and it will therefore be seen that as the parts rotate, the disk or plate 121 nutates thereby to work the pistons 112 back and forth around the cylinders 111 so long as the pistons are free to do so. The periphery of the nutating disk 121 is free to rotate in the internal groove 145 of the cage 147.

The parts rotate in a body of liquid contained within a drum 150 having a rim 151 suitably bolted to the rim of the annular casting 107 which carries the cylinders 111. The hub 153 at the opposite end of the drum 150 houses the roller bearing 97 and a stuffing box 154 which embrace the driven shaft 91 so as to retain the body of liquid in the drum 150 and in operative relation to the ports 114 of the cylinders 111 as hereinafter described.

The entire transmission as above described is housed within a stationary transmission casing 156 which can be of any suitable form and can be secured to the reversing gear case 93 in any suitable manner. This stationary transmission gear casing 156 is shown as provided with internal lugs 157 which carry a ring 158 which is arranged concentric with the axis of the driven shaft 91. A friction brake facing 159 is secured to the face of the stationary ring 158 opposing the reversing gear case 93 and this friction brake face is engaged by the rim of a brake disc 160 which is slidingly mounted on and rotates with the driven shaft 91. For this purpose, the hub of the brake disk 160 fits the driven shaft and is provided with opposite apertures 161 receiving a cross pin or bar 162 which extends through a pair of opposite longitudinal grooves provided in the walls of the bored driven shaft 91.

Figure 8:
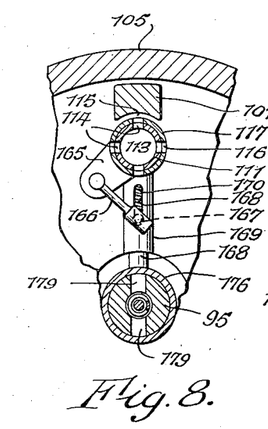
Fig. 8 is a fragmentary vertical section, taken generally on line 8—8, Fig. 6.

Means are provided for manually turning the valve sleeves 117 surrounding the cylinders 111 and actuating the brake disk 160 to obtain any desired speed of the driven shaft 91, these means being preferably constructed as follows:

As best shown in Fig. 8, an outwardly projecting lever arm 165 is fast to each of the valve sleeves 117 and the free end of this lever arm is connected by a link 166 to the end of a pin 167 projecting laterally from a radially movable slide 168. As best shown in Fig. 6, each of these slides 168 works in a radial slideway 169 provided in the annular casting 107 and the pin 167 projects through a slot 168 to the exterior of the annular casting 107. Each of the slides 168 is yieldingly urged toward the axis of the drive, driven and intermediate shafts by a helical compression spring 170 arranged in the outer end of each of the slideways 169.

The inner end of each of the slides 168 carries a ball 175 which is urged against the exterior of a sliding truncated cone 176 which fits around the intermediate shaft 95. This sliding cone 176 is provided with a pair of cross pins 178 which extend through opposite longitudinal slots 179 provided in the intermediate shaft 95. The opposing ends of the pins 178 connect with a sliding head 180 and a helical compression spring 181 urges the head 180 and hence the cone 176 to the left, as viewed in Fig. 6. The sliding head 180 carries a thrust bearing 182 which bears against the head 183 of a connecting rod 184. The other end of this connecting rod connects with the cross pin or bar 161 carried by the hub of the brake disk 160.

This hub of the brake disk 160 also carries the inner race of a thrust bearing 185 and to the outer race of this bearing is secured a nonrotatable thrust collar 186. This thrust collar 186 is actuated, in any suitable manner, by a manually controlled lever 187. By the manual manipulation of the lever 187, the nonrotatable thrust collar 186 can be moved to any desired position along the driven shaft 91. Lubricant can be supplied to the thrust bearing 185 through a fitting 188 attached to the nonrotatable thrust ring 186.

In the operation of the transmission shown in Figs. 6–10, when no pressure is applied to the manually controlled lever 187, the helical compression spring 181 urges the rod 184 to the left, as viewed in Fig. 6, thereby, through the cross pin or bar 162, to urge the brake disk 160 into braking engagement with the friction facing 159 of the stationary brake ring 158. Since the cross pin or bar 162 compels the driven shaft 91 and the brake disk 160 to rotate in unison, it will be seen that this action of the helical compression spring 181 serves to hold the driven shaft 91 stationary.

Since the helical compression spring 181 is at this time holding the rod 184 as viewed in Fig. 6, the cone 176 on the intermediate shaft 95 is also held in its extreme left position as viewed in this figure and in this position the balls 175 of the slides 168 engage the small end of the cone 176, these slides being urged into an inward position by their helical compression springs 170. In this position of the slides 168 their links 166 have drawn the arms 165, as viewed in Fig. 8, to their extreme inward position, and in this extreme inward position of the arms 165 the valve sleeves 117, to which these arms are attached, have been turned into a position in which the ports 116 of these valve sleeves are in full register with the ports 114 of the cylinders 111 which these valve sleeves 117 surround. Since these cylinders 111 are fast to the annular casting 107 which is in turn secured to the flywheel 105 of the drive shaft 10, these cylinders rotate with the drive shaft and carry with them the pistons 112. These pistons have their ends connected by the ball and socket joint 120 with the nutating disk or plate 121 and hence the rotation of the pistons 111 with the drive shaft 90 effects a similar rotation of the nutating disk or plate 121. As the pistons are free to slide on the cylinders 111, however, this rotation of the nutating disk or plate 121 merely serves to work the plungers or pistons 112 back and forth along the cylinders 111, pumping liquid into and out of these cylinders through the registering teardrop ports 114 and 116, no motion being transmitted to the cage 147, the periphery of the nutating disk or plate 121 merely riding idly around in the groove 145 in the rim 146 of this cage 147. Hence, when no pressure is applied to the manually operated lever 187, no motion is transmitted from the drive shaft 90 to the driven shaft 91 and instead a brake is applied to the driven shaft.

To start the rotation of the driven shaft 91, the operator actuates the manually controlled lever 187 so as to shift the ring 186 to the right, as viewed in Fig. 6. Since this ring is connected by the thrust bearing 185 to the hub of the brake disk 160, this movement of this ring 185 to the right effects a release of the brake disk 160 from the friction facing of the stationary brake ring 158 so as to leave the driven shaft 91 free to rotate. This movement of the brake disk 160 to the right, as viewed in Fig. 6, also shifts the cross pin or bar 162 carried by the hub of the brake disk to the right along the slots provided in the driven shaft 91. This draws the rod 184 to the right against the resistance of the helical compression spring 181 and, through the head 183, thrust bearing 182, slide 180 and pins 178, draws the cone 176 to the right, as viewed in Fig. 6. This movement of the cone 176 serves to move each of the slides 168 radially outward against the resistance of its helical compression spring 170. This outward movement of these slides 168, through their pins 167 and links 166, serves to rotate the arms 165 of the several valve sleeves 117 so as to move the teardrop ports 116 out of register with the ports 114 of the cylinders 111 to a corresponding degree. This movement of the ports 116 and 114 out of register with one another restricts the flow of fluid from the body contained within the drum 150 into and out of each of the cylinders 111 and hence places a resistance upon the free movement of the pistons or plungers 112 along these cylinders. Accordingly, the free nutation of the nutating disk or plate 121 is restricted and its free rotation in the angular groove 145 is likewise impeded so that power is transmitted through this nutating disk or plate 121 to the rim 146 of the cage 147. Since this cage 147 is fast to the driven shaft 91, this motion is transmitted to the driven shaft and hence a drive is established between the driving and driven shafts 90 and 91.

When a higher speed of the driven shaft 91 is desired, the operator moves the manually controlled lever 187 to a greater degree, thereby to rotate the control valve sleeves 117 to move the ports 116 of the valve sleeves 117 still further out of register with the ports 114 of the cylinders. This imposes a still greater restriction to the free movement of the pistons 112 back and forth on the cylinders 111 and hence further restricts the free rotation of the nutating plate or disk 121 in the groove 145, thereby to drive the cage 147 and driven shaft 91 at a still higher speed. When the manually controlled lever 187 has been moved far enough to move the ports 116 of the control valve sleeves 117 completely out of register with the ports 114 of the cylinders 111, no fluid can be pumped into and out of the cylinders 111 and hence the plungers 112 are held against all movement. When this occurs the rotation of the nutating disk or plate 121 is stopped and a direct drive is established through the cage 147 to the driven shaft 91.

It will therefore be seen that in the form of the invention shown in Figs. 6–10 the adjustment of the manually controlled lever 187 adjusts the valve sleeves 117 to cover the ports 114 to a greater or less degree and hence that the present transmission provides a transmission in which the driven shaft can be gradually brought up to the speed of the driving shaft or can be held to any speed desired.

From the foregoing it will be seen that the present invention provides an extremely simple hydraulic transmission in which any desired speed of the driven shaft can be obtained either through an automatic control responsive to the speed of the driving shaft or through a manual control and which is composed of a relatively few number of parts which can be easily produced and assembled or disassembled, the construction particularly lending itself to the mass production of transmissions of this character. It will further be seen that the transmission can be used in lieu of the usual gear shift mechanism between a driving and driven part or it can be used as a torque absorber to cushion the drive shaft against unusual and severe loads which may be placed upon the driven shaft as, for example, when the propeller of a propeller shaft reenters the water after racing in the air.

We claim as our invention:

1. A transmission for transmitting power between a rotary driving part and a substantially coaxial rotary driven part, comprising a cage fast to said driven part and having a rim provided with an internal annular bearing groove having opposed bearing faces disposed at an angle to a plane perpendicular to the axis of said driven part, a nutating disk having its rim journaled in said groove and having opposite radial faces in bearing engagement with said bearing faces of said groove, an annular member fast to said driving part and carrying an annular series of cylinders arranged substantially equidistant from and parallel with the axis of said driving part, a piston operatively associated with each of said cylinders to pump liquid into and out of said cylinders, a ball and socket joint connecting the corresponding end of each piston with the adjacent part of said nutating disk and means for simultaneously adjustably restricting the flow of said liquid into and out of said cylinders.

2. A transmission for transmitting power between a rotary driving part and a substantially coaxial rotary driven part, comprising a cage fast to one of said parts and having a two part rim provided with an internal annular bearing groove having opposed bearing faces disposed at an angle to a plane perpendicular to the axis of said parts, the said parts of said rim being divided along a plane parallel with and intersecting said annular groove, a nutating disk journaled in said groove and having opposite radial faces in bearing engagement with said bearing faces of said groove, fastening means for holding the two parts of said rim together to rotatably confine said nutating disk in said groove, an annular member fast to the other of said parts and carrying an annular series of cylinders arranged substantially equidistant from and parallel with the axis of said parts, a piston operatively associated with each of said cylinders to pump liquid into and out of said cylinders, means operatively connecting the corresponding end of each of said pistons with an adjacent part of said nutating disk, and means for adjustably restricting the flow of said liquid into and out of said cylinders.

3. A transmission for transmitting power between a rotary driving part and a substantially coaxial rotary driven part, comprising a cage fast to one of said parts and having a rim provided with an internal annular bearing groove disposed at an angle to a plane perpendicular to the axis of said parts, a nutating disk journaled in said bearing groove and comprising two substantially counterpart disk sections arranged face to face along a radial central plane and fastening means connecting said disk sections, an annular member fast to the other of said parts and carrying an annular series of cylinders arranged substantially equidistant from and parallel with the axis of said parts, a piston operatively associated with each of said cylinders to pump liquid into and out of said cylinders, means confined between said disk sections and providing an articulated joint between the corresponding end of each of said pistons and the adjacent part of said nutating disk, and means for adjustably restricting the flow of said liquid into and out of said cylinders.

4. A transmission for transmitting power between a rotary driving part and a substantially coaxial rotary driven part, comprising a cage fast to one of said parts and having a rim provided with an internal annular bearing groove disposed at an angle to a plane perpendicular to the axis of said parts, a nutating disk journaled in said bearing groove and comprising two substantially counterpart disk sections arranged face to face along a radial central plane and fastening means connecting said disk sections, an annular member fast to the other of said parts and carrying an annular series of cylinders arranged substantially equidistant from and parallel with the axis of said parts, a piston operatively associated with each of said cylinders to pump liquid into and out of said cylinders, means confined between said disk sections and providing a ball and socket joint between the corresponding end of each of said pistons and the adjacent part of said nutating disk, and means for adjustably restricting the flow of said liquid into and out of said cylinders.

5. A transmission for transmitting power between a rotary driving part and a substantially coaxial rotary driven part, comprising a cage fast to one of said parts and having a rim provided with an internal annular bearing groove having opposed bearing faces disposed at an angle to a plane perpendicular to the axis of said parts, a nutating disk journaled in said bearing groove and comprising two substantially counterpart disk sections arranged face to face along a radial central plane and fastening means connecting said disk sections, said nutating disk having opposite radial faces in bearing engagement with said bearing faces of said groove, an annular member fast to the other of said parts and carrying an annular series of cylinders arranged substantially equidistant from and parallel with the axis of said parts, a piston operatively associated with each of said cylinders to pump liquid into and out of said cylinders and provided at its free end with a reduced neck and a ball, said disk sections being jointly formed to provide a plurality of spherical sockets each receiving a corresponding ball and each having an opening receiving the corresponding neck, and means for adjustably restricting the flow of said liquid into and out of said cylinders.

6. A transmission for transmitting power between a rotary driving part and a substantially coaxial rotary driven part, comprising a cage fast to one of said parts and having a rim provided with an internal annular bearing groove disposed at an angle to a plane perpendicular to the axis of said parts, a nutating disk journaled in said bearing groove and comprising two disk sections arranged face to face and fastening means connecting said disk sections, an annular member fast to the other of said parts and carrying an annular series of cylinders arranged substantially equidistant from and parallel with the axis of said parts, a piston operatively associated with each of said cylinders to pump liquid into and out of said cylinders the free end of each of said pistons being formed to provide an ear having a spherical socket with openings at its sides, a ball in said socket, a pin extending through said ball and projecting outwardly from said openings, a small disk embracing each end of said pin, said disk sections being jointly formed to provide a recess receiving and confining each of said small disks, and means for adjustably restricting the flow of said liquid into and out of said cylinders.

7. A transmission for transmitting power between a rotary driving part and a substantially coaxial rotary driven part having a spherical enlargement, comprising a cage fast to said driven part and having a rim provided with an internal annular bearing groove disposed at an angle to a plane perpendicular to the axis of said parts, a nutating disk journaled in said bearing groove and having a central spherical socket embracing said spherical enlargement of said driven shaft, an annular member fast to said driving part and carrying an annular series of cylinders arranged substantially equidistant from and parallel with the axis of said parts, a piston operatively associated with each of said cylinders to pump liquid into and out of said cylinders, means operatively connecting the corresponding end of each of said pistons with an adjacent part of said nutating disk and means for adjustably restricting the flow of said liquid into and out of said cylinders.

8. A transmission for transmitting power between a rotary driving part and a substantially coaxial rotary driven part, having a spherical enlargement, comprising a cage fast to said driven part and having a rim provided with an internal annular bearing groove disposed at an angle to a plane perpendicular to the axis of said parts, a nutating disk journaled in said bearing groove and comprising two disk sections arranged face to face and fastening means connecting said disk sections, said disk sections being jointly formed to provide a central spherical socket embracing said spherical enlargement of said driven shaft, an annular member fast to said driving part and carrying an annular series of cylinders arranged substantially equidistant from and parallel with the axis of said parts, a piston operatively associated with each of said cylinders to pump liquid into and out of said cylinders, means operatively connecting the corresponding end of each of said pistons with an adjacent part of said nutating disk and means for adjustably restricting the flow of said liquid into and out of said cylinders.

9. A transmission for transmitting power between a rotary driving part and a substantially coaxial rotary driven part, comprising a freely rotatable intermediate shaft arranged coaxially between said driving and driven parts and having a spherical enlargement, a cage fast to said driven part and having a rim provided with an internal bearing groove disposed at an angle to a plane perpendicular to the axis of said parts, a nutating disk journaled in said bearing groove and having a central spherical socket embracing said spherical enlargement of said driven shaft, an annular member fast to said driving part and carrying an annular series of cylinders arranged substantially equidistant from and parallel with the axis of said parts, a piston operatively associated with each of said cylinders to pump liquid into and out of said cylinders, means operatively connecting the corresponding end of each of said pistons with an adjacent part of said nutating disk and means for adjustably restricting the flow of said liquid into and out of said cylinders.

10. A transmission for transmitting power between a rotary driving part and a substantially coaxial rotary driven part, comprising a freely rotatable intermediate shaft arranged coaxially between said driving and driven parts and having a spherical enlargement, a cage fast to said driven part and having a rim provided with an internal bearing groove disposed at an angle to a plane perpendicular to the axis of said parts, a nutating disk journaled in said bearing groove and comprising two disk sections arranged face to face and fastening means connecting said disk sections, said disk sections being jointly formed to provide a central spherical socket embracing said spherical enlargement of said intermediate shaft, said spherical enlargement and said socket being provided with interfitting keys and keyways permitting oscillation of said nutating disk about said spherical enlargement parallel with the plane of the axis of said intermediate shaft but compelling said nutating disk and intermediate shaft to rotate in unison, an annular member fast to said driving part and carrying an annular series of cylinders arranged substantially equidistant from and parallel with the axis of said parts, a piston operatively associated with each of said cylinders to pump liquid into and out of said cylinders, means operatively connecting the corresponding end of each of said pistons with an adjacent part of said nutating disk and means for adjustably restricting the flow of said liquid into and out of said cylinders.

11. A transmission for transmitting power between a rotary driving part and a substantially coaxial rotary driven part, comprising a nutating disk rotatably secured to one of said parts to rotate in a plane arranged at an angle to the perpendicular of the axis of said parts, an annular member fast to the other of said parts and carrying an annular series of cylinders arranged substantially equidistant from and parallel with the axis of said parts, a piston operatively associated with each of said cylinders, means operatively connecting the corresponding end of each of said pistons with an adjacent part of said nutating disk, control means arranged coaxially within one of said parts and movable axially, means for variably restricting the flow of liquid into and out of said cylinders in response to the axial movement of said control means, a stationary brake ring concentric with said driven part, a brake disk operatively connected with said control means slidingly mounted on said driven part concentric therewith and movable axially to engage with said brake ring and compelled to rotate with said driven part and means for simultaneously moving said control means axially to restrict the flow of said liquid into and out of said cylinders and actuate said brake disk to engage said stationary ring following the relief of all restriction to said flow of liquid.

12. A transmission for transmitting power between a rotary drive shaft and a substantially coaxial driven shaft having an axial bore, comprising a nutating plate rotatably secured to said driven shaft to rotate in a plane arranged at an angle to the perpendicular of the axis of said shafts, an annular member fast to the drive shaft and carrying an annular series of cylinders arranged substantially equidistant from and parallel with the axis of rotation of said shafts, a piston operatively associated with each of said cylinders, means operatively connecting the corresponding end of each of said pistons with an adjacent part of said nutating disk, a stationary brake ring concentric with said driven shaft, a brake disk slidingly mounted on said driven shaft to engage with said brake ring and compelled to rotate with said driven shaft, a rod slidingly arranged in said bore of said driven shaft, means for actuating said sliding rod, means for restricting the flow of said liquid into and out of said cylinders in response to the movement of said rod, and means for sliding said brake disk into and out of engagement with said brake ring in response to the movement of said rod.

13. A transmission for transmitting power between a rotary drive shaft and a substantially coaxial driven shaft, comprising means providing an enclosure around the opposing ends of said driving and driven shafts and adapted to contain a body of liquid, a nutating plate in said enclosure rotatably secured to said driven shaft to rotate in a plane arranged at an angle to the perpendicular of the axis of said shafts, an annular member in said enclosure fast to said drive shaft, an annular series of cylinders carried by said annular member, each having a closed end and an open end facing said nutating plate and each having an exposed port, a piston operatively associated with each of said cylinders, means operatively connecting the corresponding end of each of said pistons with an adjacent part of said nutating disk, an axially movable cone arranged in said enclosure substantially coaxial with said drive and driven shafts, a slide member associated with each cylinder and mounted for radial movement on said annular member to engage the taper of said cone, spring means for holding each of said slide members against said cone, means for opening and closing said port in response to the said radial movement of said slide members and means for adjustably moving said cone axially.

14. A transmission for transmitting power between a rotary drive shaft and a substantially coaxial driven shaft, comprising means providing an enclosure around the opposing ends of said driving and driven shafts and adapted to contain a body of liquid, a nutating plate in said enclosure rotatably secured to said driven shaft to rotate in a plane arranged at an angle to the perpendicular of the axis of said shafts, an annular member in said enclosure fast to said drive shaft, an annular series of cylinders carried by said annular member, each having a closed end and an open end facing said nutating plate and each having an exposed port in its side, a piston operatively associated with each of said cylinders, means operatively connecting the corresponding end of each of said pistons with an adjacent part of said nutating disk, a valve sleeve on each of said cylinders and having a port adapted to register with the port in its cylinder and rotatable to move the companion ports into and out of register with each other, an axially movable cone arranged in said enclosure substantially coaxial with said drive and driven shafts, means for rotating said valve sleeves in response to the said axial movement of said cone and means for adjustably moving said cone axially.

PAUL A. DEARDORFF.
CHARLES A. BALTON.